United States Patent Office
3,436,373
Patented Apr. 1, 1969

3,436,373
PHENOL-FORMALDEHYDE-ALIPHATIC AMINE
CONDENSATION PRODUCTS
Eugene F. Cox, Charleston, and Robert J. Knopf, St.
Albans, W. Va., assignors to Union Carbide Corporation, a corporation of New York
No Drawing. Filed Apr. 16, 1965, Ser. No. 448,859
Int. Cl. C08g 23/12, 9/34
U.S. Cl. 260—51.5                           11 Claims

ABSTRACT OF THE DISCLOSURE

Ternary condensation products produced by reacting a phenol, formaldehyde and a primary aliphatic amine at a temperature below about 110° C. are reacted, below about 110° C., with a vicinal epoxide to produce a heat-stable addition product that is useful in the production of urethane polymers.

---

The invention relates to ternary condensation products of a phenol, formaldehyde, and a primary aliphatic amine. In one aspect, the invention relates to novel vicinal epoxide addition products of phenol-formaldehyde-primary aliphatic amine condensation products. In another aspect, the invention relates to a novel process for producing vicinal epoxide addition products of phenol-formaldehyde-primary aliphatic amine condensation products. In a further aspect, the invention relates to the use of alkylene oxide addition products of phenol-formaldehyde-primary aliphatic amine condensation products in the production of urethane polymers.

It is known that phenols condense with formaldehyde and primary or secondary amines to yield aminomethylphenols. For instance, the reaction of phenol with formaldehyde and dimethylamine produces high yields of 2,4,6-tris(N,N - dimethylaminomethyl)phenol in accordance with the equation:

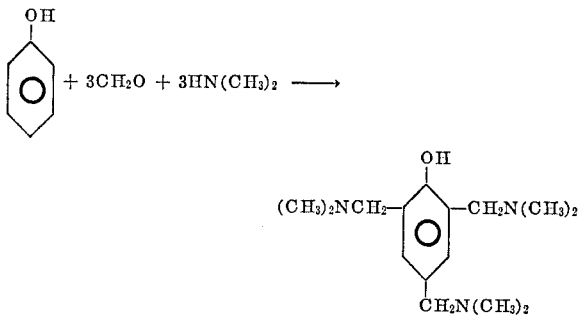

When the amine employed is a primary amine, the aminomethyl-phenol produced by the initial reaction contains amino hydrogen that can participate in further condensation reactions. For this reason, the condensation products derived from primary amines, phenol, and formaldehyde can polymerize, when heated, to insoluble, infusible (i.e., thermoset) polymers.

The invention, in one major aspect, provides soluble, fusible compositions that are produced by adding vicinal epoxide to condensation products of a phenol, formaldehyde, and a primary amine. The addition of vicinal epoxide to said condensation products converts heat-polymerizable compositions to heat-stable (i.e., nonthermosetting) compositions.

In the production of the phenol, formaldehyde, primary amine condensation products that are employed in the invention, many phenols can be employed. For instance, among the phenols that can be employed are those that are represented by Formula I:

I 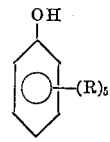

wherein each R individually represents hydrogen, alkyl, aryl, alkoxy, aralkyl, alkaryl, hydroxyl, hydroxyaralkyl, alkylamino, dialkylamino, chloro, cycloalkyl, and the like, provided that at least one and preferably at least two R variables represent hydrogen that is bonded to a reactive position on the aromatic nucleus. The reactive positions are normally ortho and para to the phenolic hydroxyl. Among the phenols that can be employed there are phenol (i.e., monohydroxybenzene), o-, m-, and p-cresol, o-, m-, and p-ethylphenol, o-, m-, and p-propylphenol, para-t-butylphenol, the pentylphenols, the hexylphenols, the octylphenols, the nonylphenols, the decylphenols, the dodecylphenols, the pentadecylphenols, the octadecylphenols, the dimethylphenols, the diethylphenols, cresylic acids and other mixture of alkylphenols, o-, m-, and p-chlorophenol, certain dichlorophenols, o-, m-, and p-N-methylaminophenol, o-, m-, and p-N,N-dimethylaminophenol, resorcinol, catechol, phloroglucinol, benzylphenol, 2,2-bis(4-hydroxyphenyl)propane, bis(4-hydroxyphenyl)methane, phenylphenol, tolylphenol, cyclohexylphenol, 2-methyl-5-chlorophenol, and the like. Normally, the R variables will contain a total of not more than about 18 carbon atoms. The preferred phenols are phenol (i.e., monohydroxybenzene) and the alkylphenols.

A wide variety of primary aliphatic amines can be employed in the production of the condensation products. For instance, many of the useful amines that can be employed in the invention are those that are represented by Formula II:

II                    R¹NH₂ wherein R¹ can be alkyl, hydroxyalkyl, cycloalkyl, cycloalkenyl, aralkyl, amino, aminoalkyl, aryloxyalkyl, alkenyl, heterocyclylalkyl, and the like, wherein the amine has up to about 18 carbon atoms. Specific illustrative primary aliphatic amines include methylamine, ethylamine, butylamino, 2-ethylhexylamine, decylamine, octadecylamine, 2-hydroxyethylamine, 2-hydroxypropylamine, 2-hydroxybutylamine, 2-hydroxycyclohexylamine, cyclohexylamine, 3-(aminomethyl)cyclohexylamine, benzylamine, hydrazine, ethylenediamine, diethylenetriamine, 2-phenoxyethylamine, allylamine, 2-aminomethyltetrahydrofuran, and the like. The preferred primary aliphatic amines are the alkylamines and the hydroxyalkylamines. Particularly preferred amines include 2-hydroxyethylamine and 2-hydroxypropylamine.

The proportions of phenol, formaldehyde, and amine can vary over a fairly wide range. For example, the molar proportion of phenol:(formaldehyde plus amine) can vary from about 0.6:1 to about 3.3:1, and preferably from about 0.7:1 to about 2:1. The molar proportion of formaldehyde:amine can vary from about 0.75:1 to about 3:1, and is preferably from about 1:1 to about 2:1. The above proportions are appropriate for the case where the only amino hydrogens in the primary amine are the two primary amino hydrogens. When, for instance, ethylenediamine or other amine containing more than 2 amino hydrogens is employed, the amount of amine employed in the reaction mixture can be proportionally less than that indicated above.

The condensation product can be produced by slowly adding formaldehyde (which can be in aqueous solution) to an agitated mixture of the phenol and amine. The addition period is then followed by a reaction period. It is of critical importance that the formaldehyde addition and subsequent reaction period be carried out at a temperature below the temperature at which the condensation product polymerizes to an insoluble, infusible polymer. For this reason, the addition and subsequent reaction are carried out at a temperature below about 110° C. Broadly, the reaction temperature can be within the range of from about 5° °C. to about 110° C., and preferably from about 25° C. to about 100° C. The formaldehyde addition time can be from about ½ to about 10 hours, and the subsequent reaction time can also be from about ½ to about 10 hours. These times are narrowly critical.

If desired, a solvent can be employed for the formaldehyde addition and subsequent reaction period. Organic liquids such as methanol, tetrahydrofuran, isopropyl alcohol, dioxane, and the like, can be employed. The use of a solvent is entirely optional. The pressure under which the reaction is carried out is not critical, and it can be atmospheric, super-atmospheric, or sub-atmospheric.

The recovery of the condensation product can be by conventional methods. For instance, water of condensation, unreacted starting material, solvents, and the like, can be removed by distillation under reduced pressure. It is important that the distillation temperature not rise above the polymerization temperature of the condensation product (i.e., about 110° C.), and for this reason reduced pressure below about 10 millimeters of mercury is normally employed for the distillation.

The reaction equipment can be constructed of standard materials such as stainless steel, glass, mild steel, and the like. The equipment can be a conventional reactor equipped with agitator, heat transfer means, distillation and reflux means, and the like.

The condensation products produced by the above-described procedure are glassy solids at room temperature, and they are readily soluble in most polar organic liquids as well as in aqueous acid or base. At room temperature, the condensation products are stable and they can be stored for long periods of time with no noticeable change in chemical or physical properties.

The heat-sensitive condensation product of phenol, formaldehyde, and primary aliphatic amine is then reacted with a vicinal epoxide to form heat-stable compositions. The vicinal epoxides employed are usually the alkylene oxides (i.e., epoxyalkanes) such as ethylene oxide, propylene oxide (1,2-epoxypropane), butylene oxides, epoxypentanes, epoxyhexanes, and the like. Many other vicinal epoxides can also be employed. Examples include the cycloaliphatic epoxides such as epoxycyclohexane, epoxycyclopentane, and the like, the aryl-substituted alkylene oxides such as styrene oxide, and the like, the halogen-substituted alkylene oxides such as 3-chloro-1,2-epoxypropane, and the like. In addition, poly epoxides can be employed, usually in combination with a major amount of monoepoxide. Illustrative useful polyepoxides include the diglycidyl diether of 2,2-bis(4-hydroxyphenyl)propane, bis(2,3-epoxycyclopentyl) ether 3,4-epoxy-6-methylcyclohexylmethyl, 3,4-epoxy-6-methylcyclohexanecarboxylate, vinyl cyclohexane dioxide, bis (3,4-epoxy-6-methylcyclohexylmethyl) adipate, glycerol tris(3,4-epoxy-6-methylcyclohexanecarboxylate), and the like.

The epoxide employed will be an organic compound that contains at least 1 and up to 4 or more vicinal epoxide groups, and which preferably contains no group other than the epoxide group which is reactive with amino hydrogen or with phenolic hydroxyl. The preferred epoxides contain no more than about 30 carbon atoms. The most preferred epoxides are the alkylene oxides, especially those that contain from 2 to 4 carbon atoms. Propylene oxide and mixtures of propylene oxide with ethylene oxide are particularly preferred.

The epoxide addition is preferably carried out under super-atmospheric pressure when a volatile epoxide such as an alkylene oxide is used. Therefore, an autoclave equipped with agitator, heat transfer means, and the like can be employed for the addition. During the addition of epoxide, the reaction temperature should be maintained below the polymerization temperature of the phenol-formaldehyde-amine condensation product until there has been added sufficient epoxide to produce a heat-stable composition. The minimum amount of epoxide needed to produce a heat-stable composition is that amount which will react with all of the amino hydrogens present in the condensation product, and preferably, also with substantially all of the phenolic hydroxyl hydrogens.

The epoxide addition is carried out by adding the epoxide to the condensation product at a temperature of about 70° C. to 110° C., or preferably from about 90° to about 100° C. The reaction continues, without catalyst, until substantially all of the reactive hydrogens that cause the condensation product to be heat-polymerizable (i.e., the amino hydrogens and substantially all of the phenolic hydroxyl hydrogens) have been converted to hydroxyalkyl (or substituted-hydroxyalkyl) groups. The pressure under which the epoxide addition reaction is carried out is preferably super-atmospheric, for instance, up to about 150 p.s.i.g., or more, when an alkylene oxide is employed as the epoxide. It is usually desirable to maintain an inert atmosphere such as nitrogen in the reaction vessel. When a highly reactive epoxide is employed (such as ethylene oxide), the reaction may be exothermic and cooling means may be required to maintain the desired reaction temperature.

The reaction time for the epoxide addition reaction is dependent, in part, upon factors such as reaction temperature and pressure, nature of reactants, and the like. When the epoxide employed is an alkylene oxide, it has been found that reaction times of from about ½ hour to about 20 hours, or more, are frequently eencountered.

The above-described, low temperature (below about 110° C.), uncatalyzed addition of epoxide to the condensation product produces a heat-stable addition product having wide utility. For example, the stable addition product can be stripped of unreacted epoxide and can then be reacted with drying oil acids to produce useful coating compositions. The stable addition product can also be reacted with additional alkylene oxide (preferably ethylene oxide or propylene oxide) to produce novel polyols having wide utility. In producing such polyols, the stable addition product need not be recovered from the reaction vessel, but rather can be reacted with alkylene oxide in the same reaction vessel. This reaction proceeds readily without catalysts at temperatures above about 130° C., up to, for example, about 180° C. A base catalyst such as sodium methoxide or potassium hydroxide can be employed, if desired. By using a catalyst, the reaction can be conducted at slightly lower temperatures, for instance, about 100° to 150° C. The alkylene oxide addition is continued until a polyol having the desired hydroxyl number is obtained. The hydroxyl number will normally be at least about 40 up to about 550 or more, depending upon the use intended for the polyol. The polyol is recovered by standard procedures, such as by first stripping to remove unreacted alkylene oxide followed by removal of the catalyst (if one has been used) by standard procedures.

The polyols are widely useful. For instance, they can be employed as hardeners for polyepoxide resins. They can be esterified with drying oil acids to produce coating compositions, and they are widely useful as chemical intermediates.

In another major aspect, the invention provides urethane polymers that are produced by reacting the polyols of the invention with organic polyisocyanates. Many organic polyisocyanates can be employed for this purpose, including 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of anilineformaldehyde condensation products, dianisidine diisocyanate, bitolylene diisocyanate, xylylene diisocyanate, naphthalene diisocyanate, hexamethylene diisocyanate, bis(2-isocyanatoethyl)fumarate, bis(2-isocyanatoethyl)carbonate, and many other organic polyisocyanates that are known in the art, such as those that are disclosed in an article by Siefken, Ann., 562, 75 (1949). In general, the aromatic polyisocyanates are preferred because of their greater reactivity.

In producing the urethane polymers of the invention, one or more polyols in addition to the polyols of the invention can be employed in the reaction with the organic polyisocyanate. Such additional polyols that can be employed are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphonic acid, polyphosphoric acids such as tripolyphosphoric acid and tetrapolyphosphoric acid, phenol-aniline-formaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris(dipropylene) glycol phosphite and other phosphites are useful in urethane foams.

The foregoing are merely illustrative of the many polyols can be employed in conjunction with the polyols of the invention.

The polyol or polyol mixture employed can have hydroxyl numbers which vary over a wide range. In general, the hydroxyl numbers of the polyols employed in the invention can range from about 20, and lower, to about 1,000, and higher, preferably, from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH=Hydroxyl number of the polyol $f$=Average functionality, that is average number of hydroxyl groups per molecule of polyol
M.W.=Average molecular weight of the polyol The exact polyol employed depends upon the end-use of the urethane product. For example, when used to prepare foams, the molecular weight and the hydroxyl number are selected properly to result in flexible, semiflexible, or rigid foams. The polyol preferably possesses a hydroxyl number of from about 200 to about 800 when employed in rigid foam formulations, from about 50 to about 250 for semiflexible foams, and from about 20 to about 70 or more when employed in flexible foam formulations. Such limits are not intended to be restrictive, but are merely illustrative of the large number of possible combinations of the polyols that can be employed.

The urethane polymers of the invention can take the form of foamed products, elastomers, surface coatings, castings, and the like. The foamed products are preferably produced by the one-shot technique wherein all of the reactants are reacted simultaneously with the foaming operation. In producing elastomers and castings, the prepolymer technique is useful. In the prepolymer technique, the isocyanate is reacted with a slightly less than stoichiometric quantity of polyol to produce a prepolymer having a low percentage (e.g., from 4 to 10 percent) of free —NCO groups. The prepolymer is subsequently converted into an elastomer by reacting with a cross-linking agent having reactive hydrogen atoms such as a diamine, for instance, a bis(aminochlorophenyl)methane. An acid stabilizer may be necessary when employing the polyols of the invention in a prepolymer technique because said polyols are very reactive. In producing surface coatings, there are several types of known reaction techniques which can be employed. The following are representative:

(1) use of a prepolymer having a low percentage of free —NCO that is cured by atmospheric moisture;
(2) a two-component system in which a prepolymer is mixed with a polyol just before application;
(3) a one-package system comprising two ingredients and requiring a heat cure. One of the ingredients is a polyisocyanate prepolymer in which the free —NCO groups have been blocked (e.g., with phenol) to make the isocyanate groups non-reactive until unblocked by heat. The second ingredient is a polyol.
(4) a one-component system containing no free isocyanate. Unsaturated fatty acid diglycerides are reacted with polyisocyanate to cross-link the ester chains. Cure occurs through conventional oxidative drying of the fatty acid chains.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of about 1.0 to 1.2 equivalents of —NCO per equivalent of active hydrogen, and preferably a ratio of about 1.05 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction or by a combination of the two methods. All of these methods are known in the art. The preferred blowing agents are water and certain halogen-substituted aliphatic hydrocarbon which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2 - trifluoroethane, 2-chloro-1,1,1,2,3,3,4,4,4 - nonafluorobutane, hexafluorocyclobutene, and octafluorocyclobutane, Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N'-tetramethyl-1,3-butanediamine, N,N-dimethylethanolamine, 1,4 - diazabicyclo-[2.2.2]octane, bis[2-(N,N-dimethylamino)ethyl] ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

When producing urethane foams, it is useful in many cases to employ a surfactant which serves as a stabilizer in making flexible foams and as a cell size regulator in making rigid foams. Polysiloxane-polyoxyalkylene block copolymers are useful surfactants for this purpose. Among the polysiloxanepolyoxyalkylene block copolymers that are useful here are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I, "Chemistry," was published in 1963 and Part II, "Technology," in 1964.

The urethane polymers of the invention have wide utility. For instance, they can be employed as elastomers, rigid and flexible foams, coatings, and the like. The wide utility as gaskets, sealers, in insulation, cushions and padding, in paints, and the like, of such urethane polymers is well known.

The examples which follow illustrate the invention.

Example 1

(A) Preparation of phenol-formaldehyde-monoethanolamine condensation products

To a 3-liter, 4-necked glass kettle equipped with a stirrer, thermometer, dropping funnel, nitrogen gas inlet tube and stillhead was charged a mixture of 1,505 grams (16.0 moles) of phenol and 245 grams (4.0 moles) of monoethanolamine. At the temperature of 30–35° C., 651 grams (8.0 moles) of formaldehyde (as 37% aqueous solution) was introduced at a rate such that the temperature did not exceed 35° C. during the addition. After an additional one hour at 30° C., the charge was heated to 75–80° C. for one hour and removal of water was then begun by stripping to a temperature of 98° C. and gradually reducing the pressure on the system. Stripping of excess phenol was accomplished by reducing the pressure finally to 1 mm. of mercury and permitting the kettle temperature to reach a maximum of 100° C. In this way there was obtained 1,167 grams of a reddish-orange glasslike resin having a nitrogen content of 4.48 weight percent, a hydroxyl number of 708, and acetylation equivalent weight of 87.0, a phenolic equivalent weight of 129.5, an active hydrogen equivalent weight of 64.7 and an average molecular weight of 265.

(B) Preparation of stable epoxide addition product

To a 300 ml. glass kettle equipped with a dropping funnel, stirrer, thermometer and Dry-Ice acetone condenser was charged 104.1 grams of the resin of Example 1A. At a temperature of 98±2° C. (water-bath heating) propylene oxide was added dropwise until a steady reflux of oxide indicated that the resin was completely "capped." By stripping off the last traces of oxide at a pot temperature of 105° C. and a pressure of 15 mm. of mercury or less, is was found that 43.7 percent by weight propylene oxide had added at this point. The resulting stable resin was a very viscous, tacky mass having a hydroxyl number of 489.

(C) Preparation of polyol

The stable epoxide addition product of Example 1B was converted to a finished polyol by the further addition, at 150° C. in a stirred autoclave, of sufficient propylene oxide to produce a material having a final oxide content of 56–57 weight percent. The pressure of the autoclave was 105–110 p.s.i.g. initially, but after about 9 hours of reaction a constant pressure of about 10 p.s.i.g. indicated that substantially all of the oxide had been consumed. Stripping of the product to 130° C. at a pressure of less than 1 mm. of mercury left a polyether polyol having a hydroxyl number of 400.2. Using the same stable resin as a starter, but carrying out the oxide addition at 125–135° C. in the presence of sodium methoxide catalyst, neutralizing the catalyst with carbon dioxide and removing the salts by filtration, there was produced a polyol of hydroxyl number 402.7, oxide content 56.8 weight percent, molecular weight of 590, pH of 11.9 and viscosity of 360,000 cps. at 25° C.

Example 2

Condensation of 16 moles of o-cresol with 8 moles of formaldehyde and 4 moles of monoethanolamine in the manner of Example 1A resulted in the product of 1,222 grams of condensation product having a hydroxyl number of 688, an average molecular weight of 349, an acetylation equivalent weight of 113.4, an active hydrogen equivalent weight of 80.5, a nitrogen content of 4.43 percent, a viscosity of 3,200 cps. at 90° C. and a phenolic equivalent weight of 154.4.

In a manner analogous to that described in Examples 1B and 1C, the condensation product described immediately above was converted by propylene oxide addition to a polyether polyol having a hydroxyl number of 324, an average molecular weight of 830, a functionality of 4.79, an oxide content of 57.3, a pH of 12.0, a viscosity of 99,000 cps. at 25° C. and an average oxide chain length of 1.71 units.

Example 3

In the manner of Example 1A, 18 moles of phenol was condensed with 9 moles of formaldehyde and 3 moles of ammonia, in the form of a 28 percent aqueous solution. Upon completion of the reflux period the charge was cooled to 40° C. and diluted with 3,000 mls. of toluene. The two-phase system was separated and the organic layer dried azeotropically at 45–55° C. under reduced pressure. The toleuene solution was then treated with a large excess of propylene oxide at 50–65° and then stripped to 100° C. at 1 mm. pressure to recover excess phenol in the amount of 459 grams. Propylene oxide addition to the residue was continued at 95–100° C. until no more oxide would add. Stripping left 1,818 grams of stable resin having a hydroxyl number of 421.5.

The stable resin described immediately above the converted to a polyether polyol by further addition of propylene oxide at 130–140° C. in the presence of sodium methoxide catalyst. After neutralization of an isopropanol solution of the product with carbon dioxide, filtration to remove the salts and restripping of the solvent, the polyol obtained had a hydroxyl number of 374, a molecular weight of 514, an average functionality of 3.4, a pH of 11.8 and a viscosity in excess of 2,000,000 cps. at 25° C.

Example 4

In a manner analogous to that described in Example 1A except that 1,400 grams of methanol was added as a reaction vehicle, a mixture of 9 moles of phenol, 6 moles of formaldehyde, and 3 moles of isopropanolamine was condensed to produce 878 grams of a glasslike resin having a hydroxyl number of 702, an acetylation equivalent weight of 79.9, an active hydrogen equivalent weight of 64.1, an average molecular weight of 277, a nitrogen content of 5.22 percent and a phenolic equivalent weight of 153.3.

The polyol produced by adding propylene to the above-described condensation product by the two steps described in Examples 1B and 1C had a hydroxyl number of 413, an average molecular weight of 587, an average functionality of 4.33, a pH of 9.8, an oxide content of 56.7 percent and an average chain length of 1.32 propylene oxide units.

Example 5

In a manner analogous to that described in Example 1A, 3 moles of p-chlorophenol and 2 moles of formaldehyde were condensed with 1 mole of monoethanolamine to give 328 grams of a condensation product having a hydroxyl number of 503, a molecular weight of 357, an acetylation equivalent weight of 120.9, an active hydrogen equivalent weight of 94.2, a nitrogen content of 3.99 percent and a chlorine content of 20.77 percent.

Addition of propylene oxide to the resin described above yielded, at an overall oxide content of 37.3 weight percent, a polyol having an hydroxyl number of 372, a molecular weight of 654, a functionality of 4.33 and a pH of 9.0.

EXAMPLE 6

Acording to the method of Example 1A, 16 moles of phenol and 8 moles of formaldehyde were condensed with 4 moles of allylamine to yield 1,096 grams of a condensation product having a hydroxyl number of 497, a molecular weight of 352, an acetylation equivalent weight of 114.9, an active hydrogen equivalent weight of 98.3, a nitrogen content of 3.20 percent and a viscosity of 8,940 cps. at 90° C.

The condensation product described above was reacted with propylene oxide by the two steps described in Example 1B and 1C. The resulting polyol had a hydroxyl number of 316, a molecular weight of 683, a functionality of 3.82, an overall propylene oxide content of 52.9 percent, an average chain length of 1.62 units, a pH of 9.6 and a viscosity of 1,040,000 cps. at 75° C.

EXAMPLE 7

In the manner of Example 1A, 18 moles of phenol and 12 moles of formaldehyde were condensed with 3 moles of ethylenediamine to yield 1642 grams of glassy resinous product with an hydroxyl number of 618, a molecular weight of 334, an acetylation equivalent weight of 95.5, an active hydrogen equivalent weight at 70.2, a functionality of 4.76 and a nitrogen content of 5.07 percent. This resin exhibited a Brookfield viscosity in excess of 2,000,000 cps. at 90° C.

The polyol obtained by addition of propylene oxide to the above-described condensation product had a hydroxyl number of 357, a molecular weight of 738, a functionality of 4.70, an oxide content of 59.3 percent, a chain length of 1.60 units, a pH of 11.7 and a viscosity exceeding 2,000,000 cps. at 25° C.

EXAMPLE 8

By the procedures described in Examples 1A, B, and C, a polyol was produced by adding propylene oxide to the condensation product of phenol, formaldehyde, and monoethanolamine. In producting the condensation product, the molar ratio of phenol:formaldehyde:monoethanolamine was 4:2:1. The condensation product had a hydroxyl number of 710, an average molecular weight of 292, an acetylation equivalent weight of 84.9, an active hydrogen equivalent weight of 67.8, a functionality 4.31, and contained 4.36 weight percent nitrogen. The condensation product had a Brookfield viscosity at 90° C. of 10,500 cps.

The polyol prepared by reacting the above-described condensation product with propylene oxide had a hydroxyl number of 385, a molecular weight of 610, an average functionality of 4.19, an average propylene oxide chain length of 1.43, a pH of 11.6, and contained 57 weight percent propylene oxide.

A series of three urethane foams were produced by the one-shot technique from the above-described polyol. The formulations employed in the foaming were as follows:

| Component | Parts, by weight | | |
|---|---|---|---|
| | Foam A | Foam B | Foam C |
| Polyol of Example 8 | 100 | 80 | 90 |
| Polyol A [1] | | 20 | |
| Polyol B [2] | | | 10 |
| Isocyanate [3] | 97.5 | 98 | 105.5 |
| Surfactant [4] | 1.5 | 1.5 | 1.5 |
| Dibutyltin Dilaurate | 0.1 | 0.1 | 0.05 |
| Trichloromonofluoromethane | 30 | 35 | 30 |

[1] Tris(dipropylene glycol) Phosphite.
[2] Propylene oxide adduct of diethylenetriamine having a hydroxyl number of 700.
[3] An organic polyisocyanate produced by phosgenation of an aniline-formaldehyde condensation product, the isocyanate having an isocyanate equivalent weight of 134 and an average molecular weight of 390.
[4] A siloxane-oxyalkylene block copolymer of the formula:

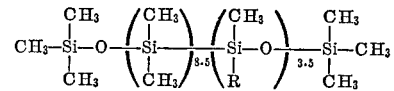

wherein R is a group of the formula $$CH_3(OC_2H_4)OC_3H_6—$$

Representative properties of the above-described foams are as follows:

| Property | Foam | | |
|---|---|---|---|
| | A | B | C |
| Cream time, seconds | 15 | 16 | 15 |
| Foam time, seconds | 60 | 66 | 52 |
| Tack-free time, seconds | 50 | 56 | 42 |
| Density, pounds/ft.[3] | 2.0 | 2.0 | 2.0 |
| Percent closed cells | 92 | 92 | 92 |
| Compressive strength, p.s.i.: | | | |
| 25° C., parallel to foam rise | 40 | 42 | 45 |
| 25° C., perpendicular to foam rise | 15 | 11 | 12 |
| 120° C., parallel to foam rise | 29 | 20 | 34 |
| 120° C., perpendicular to foam rise | 12 | 5 | 12 |

The urethane foams of the invention are also characterized by having excellent resistance to changes in volume and density after cold aging and after humid aging. The urethane foams of the invention are also relatively flame risistant. These desirable properties enhance the foam's utility in structural and insulating applications.

Typical againg and buring characteristics of the above-described foams are as follows:

| Property | Foam | | |
|---|---|---|---|
| | A | B | C |
| ASTM D 1692: | | | |
| Burning extent, inches | 3.3 | 1.5 | 2.9 |
| Ignition time, seconds | 19 | 20 | 17 |
| Extinguishment time, seconds | 55 | 45 | 48 |
| Aged compressive strength, p.s.i.: | | | |
| Cold | 39 | 39 | 41 |
| Dry | 47 | 47 | 50 |
| Humid | 38 | 31 | 38 |
| Percent volume change: | | | |
| 2 weeks, cold | 0 | 0 | 0 |
| 2 weeks, dry | 4 | 3 | 4 |
| 1 week, humid | 8 | 22 | 7 |
| 2 weeks, humid | 9 | 27 | 9 |
| 4 weeks, humid | 11 | 33 | 10 |
| Percent weight change: | | | |
| 2 weeks, cold | 0 | 0 | 0 |
| 2 weeks, dry | 1 | 1 | 1 |
| 1 week, humid | 1 | 1 | 1 |
| 2 weeks, humid | 0 | 1 | 1 |
| 4 weeks, humid | 1 | 0 | 1 |

What is claimed is:
1. Process which comprises the steps of:
(a) reacting formaldehyde, a phenol, and a primary aliphatic amine in proportions of from 0.6 to 3.3 moles of phenol per mole of formaldehyde plus amine, and from 0.75 to 3 moles of formaldehyde per mole of amine, at a temperature below about 110° C., and for a period of time sufficient to produce a ternary condensation product of said formaldehyde, phenol, and primary aliphatic amine,
(b) reacting said ternary condensation product with a vicinal epoxide at a temperature below about 110° C. for a period of time sufficient to produce a heat-stable addition product, and
(c) recovering said heat-stable addition product,
(d) wherein said phenol is a compound of the formula:

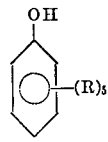

wherein each R individually represents a member of the group consisting of hydrogen, methyl, aryl, alkoxy, aralkyl, alkaryl, hydroxyl, hydroxyaralkyl, alkylamino, dialkylamino, chloro, and cycloalkyl, provided that at least one R represents a hydrogen that is bonded to a reactive position on the aromatic nucleus, and
(e) wherein said primary aliphatic amine is a compound of the formula:

R¹NH₂ wherein R¹ represents a member of the group consisting of alkyl, hydroxyalkyl, cycloalkyl, cycloalkenyl, aralkyl, amino, aminoalkyl, aryloxyalkenyl, alkenyl, and heterocyclylalkyl.

2. The process of claim 1 wherein said vicinal epoxide is an alkylene oxide of from 2 to 4 carbon atoms.
3. The process of claim 2 wherein the phenol is monohydroxybenzene, and wherein the primary aliphatic amine is a hydroxyalkylamine.
4. The process of claim 1 wherein said phenol is monohydroxybenzene.
5. The process of claim 1 wherein said phenol is an alkylphenol.
6. The process of claim 1 wherein said amine is a hydroxyalkylamine.
7. The process of claim 1 wherein the reactants for producing the ternary condensation product are phenol, formaldehyde, and monoethanolamine.
8. The process of claim 1 wherein the reactants for producing the ternary condensation product are phenol, formaldehyde, and monoisopropanolamine.
9. The process of claim 1 wherein said vicinal epoxide is ethylene oxide, propylene oxide, or a mixture thereof.
10. The heat-stable addition product produced by the process of claim 1.
11. Process which comprises the steps of:
(a) reacting formaldehyde, a phenol, and a primary aliphatic amine in proportions of from 0.7 to 2 moles of phenol per mole of formaldehyde plus amine, and from 1 to 2 moles of formaldehyde per mole of amine, at a temperature below about 110° C., and for a period of time sufficient to produce a ternary condensation product of said formaldehyde, phenol, and primary aliphatic amine,
(b) reacting said ternary condensation product with a vicinal epoxide at a temperature below about 110° C. for a period of time sufficient to produce a heat-stable addition product, and
(c) recovering said heat-stable addition product,
(d) wherein said phenol is a compound of the formula:

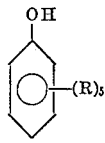

wherein each R individually represents a member of the group consisting of hydrogen, alkyl, aryl, alkoxy, aralkyl, alkaryl, hydroxyl, hydroxyaralkyl, alkylamino, dialkylamino, chloro, and cycloalkyl, provided that at least one R represents a hydrogen that is bonded to a reactive position on the aromatic nucleus,
(e) wherein said primary aliphatic amine is a compound of the formula:

R¹NH₂ wherein R¹ represents a member of the group consisting of alkyl, hydroxyalkyl, cycloalkyl, cycloalkenyl, aralkyl, amino, aminoalkyl, aryloxyalkenyl, alkenyl, and heterocyclylalkyl, and
(f) wherein said vicinal epoxide is an alkylene oxide from 2 to 4 carbon atoms.

References Cited
UNITED STATES PATENTS

| 2,114,122 | 4/1938 | Bruson | 260—127 |
| 2,998,452 | 8/1961 | Bruson et al. | 260—570.9 |
| 3,186,969 | 6/1965 | Cox et al. | 260—51.5 |
| 3,206,412 | 9/1965 | Kirkpatrick et al. | 252—344 |
| 3,245,924 | 4/1966 | Cox et al. | 260—2.5 |
| 3,278,637 | 10/1966 | Kirkpatrick | 260—838 |

FOREIGN PATENTS 816,252   8/1937   France.

OTHER REFERENCES

Noller, Chemistry of Organic Compounds, 1957, p. 481.

WILLIAM H. SHORT, *Primary Examiner.*

HOWARD SCHAIN, *Assistant Examiner.*

U.S. Cl. X.R.

260—2, 832, 2.5, 19, 29.3, 47, 75, 77.5, 826